United States Patent
Yoshizawa et al.

(10) Patent No.: US 11,814,495 B2
(45) Date of Patent: Nov. 14, 2023

(54) INFRARED TRANSMISSIVE PRODUCT

(71) Applicant: TOYODA GOSEI CO., LTD., Kiyosu (JP)

(72) Inventors: Yoshinori Yoshizawa, Kiyosu (JP); Shintaro Okawa, Kiyosu (JP); Hiroaki Ando, Kiyosu (JP); Seiichi Suzuki, Saitama (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 185 days.

(21) Appl. No.: 17/022,434

(22) Filed: Sep. 16, 2020

(65) Prior Publication Data

US 2021/0095087 A1    Apr. 1, 2021

(30) Foreign Application Priority Data

Sep. 30, 2019  (JP) .................................. 2019-178629

(51) Int. Cl.
  *C08J 7/06* (2006.01)
  *C09D 7/40* (2018.01)
  *C09D 7/61* (2018.01)

(52) U.S. Cl.
  CPC .............. *C08J 7/06* (2013.01); *C09D 7/61* (2018.01); *C09D 7/68* (2018.01); *C08J 2375/16* (2013.01)

(58) Field of Classification Search
  None
  See application file for complete search history.

(56) References Cited

U.S. PATENT DOCUMENTS

| 2018/0017721 | A1 * | 1/2018 | Nagaya | .................. G01J 1/0488 |
| 2019/0293485 | A1 * | 9/2019 | Okumura | .............. G01S 7/4813 |
| 2019/0339432 | A1 | 11/2019 | Du et al. | |
| 2019/0377111 | A1 * | 12/2019 | Taguchi | .................. G02B 5/201 |
| 2019/2377111 | * | 12/2019 | Taguchi et al. | |

FOREIGN PATENT DOCUMENTS

| JP | H04-043303 A | 2/1992 |
| JP | H09-021701 A | 1/1997 |
| JP | 5358793 B2 | 12/2013 |
| JP | 2015164881 A * | 9/2015 |
| JP | 2019-032351 A | 2/2019 |
| WO | 2018/129076 A1 | 7/2018 |

OTHER PUBLICATIONS

Kohiro et al., JP2015-164881, Sep. 17, 2015 (Machine translation) (Year: 2015).*
Japanese Office Action dated Aug. 15, 2023 issued in corresponding Japanese Patent Application 2019-178629 (and English translation).

* cited by examiner

*Primary Examiner* — Cheng Yuan Huang
(74) *Attorney, Agent, or Firm* — POSZ LAW GROUP, PLC (57) ABSTRACT

An infrared transmissive product includes a body. The body is configured to cover a transmitting unit and a receiving unit for infrared rays in an infrared sensor. The body includes a base made of a transparent plastic having an infrared transmissivity, and a coating film layer that is formed on a rear surface of the base in a transmission direction of infrared rays from the transmitting unit and has an infrared transmissivity. The coating film layer includes dispersed aggregates of particles of a pigment.

5 Claims, 4 Drawing Sheets

INFRARED TRANSMISSIVE PRODUCT

BACKGROUND

1. Field

The present disclosure relates to an infrared transmissive product that includes a body configured to cover an infrared transmitting unit and an infrared receiving unit in an infrared sensor.

2. Description of Related Art

Some vehicles are equipped with an infrared sensor in order to detect the surrounding environment. An infrared sensor is configured to transmit infrared rays from a transmitting unit to the outside of the vehicle and receive, at a receiving unit, infrared rays that strike, and are reflected by, an object outside the vehicle, such as a leading vehicle or a pedestrian. Based on the transmitted and received infrared rays, the infrared sensor recognizes the object and detects the distance between the vehicle and the object, and the relative velocity.

If the infrared sensor is provided in an exposed state, the transmitting unit and the receiving unit are visible from the outside of the vehicle. This degrades not only the appearance of the infrared sensor itself, but also the appearance of the section in the vehicle around the infrared sensor. Accordingly, the transmitting unit and the receiving unit of the infrared sensor are typically covered with an infrared transmissive product having an infrared transmissivity, such as an infrared transmissive cover.

In a vehicle equipped with an infrared transmissive product, if the color of the infrared transmissive product and the color of aesthetic components around the infrared transmissive product are significantly different from each other, consistency between the infrared transmissive product and the aesthetic components cannot be achieved, which degrades the aesthetic appeal. Accordingly, various types of infrared transmissive products have been developed that have the same color as or a color similar to the color of the aesthetic components to promote the consistency, thereby improving the aesthetic appeal. Such infrared transmissive products include one with a base and a white coating film layer. The base is made of a transparent plastic having an infrared transmissivity. The coating film layer is formed on the rear surface of the base in the transmission direction of the infrared rays and configured to allow infrared rays to pass through.

Figure 6:
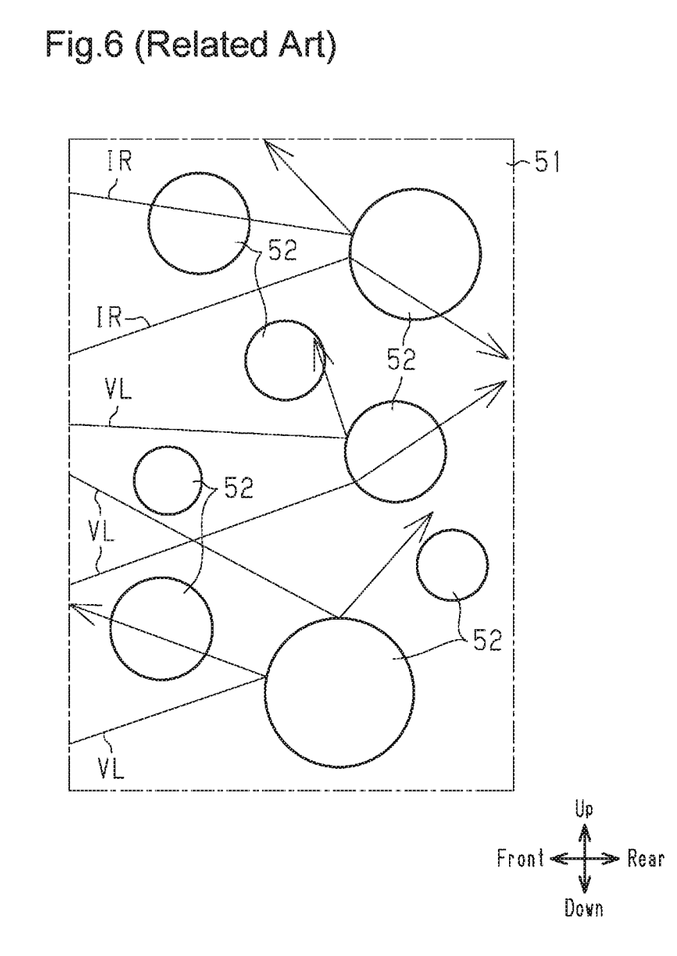
FIG. 6 is a diagram schematically showing a state in which particles of various particle sizes are dispersed in a coating film layer of a related art.

FIG. 6 illustrates a coating film layer 51 that is made of white pigment such as titanium dioxide. The coating film layer 51 is formed by a coating film in which particles 52 of uneven particle sizes are dispersed. In the coating film layer 51, visible light rays VL of various colors having different wavelengths are reflected by the particles 52. Accordingly, the infrared transmissive product appears to be white from the outside of the vehicle. In this case, however, infrared rays IR strike, and are reflected by, the particles 52, so that sufficient transmissivity of the infrared rays IR cannot be achieved.

Figure 7:
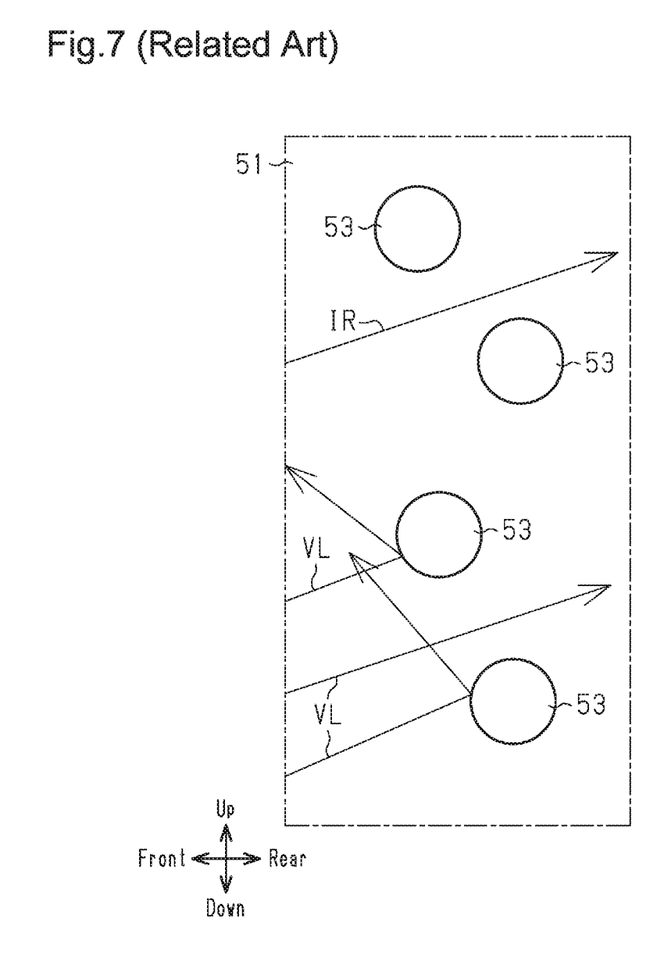
FIG. 7 is a diagram of a related art different from that in FIG. 6, schematically showing a state which fine pigment particles of uniform particle sizes are dispersed in a coating film layer.

For example, Japanese Patent No. 5358793 discloses a technique in which fine pigment particles of which the particle sizes are uniform and smaller than those in FIG. 6 of the present disclosure are dispersed in the coating layer. In the infrared transmissive product disclosed in the publication, visible light rays VL are reflected by the fine particles 53, and infrared rays IR pass through the gaps between the fine particles 53 as shown in FIG. 7 of the present disclosure.

Since the fine particles 53 in the infrared transmissive product of the publication are evenly dispersed, the gaps between the fine particles 53 are uniform. This creates a new drawback that visible light rays VL having specific wavelengths pass through the gaps between the fine particles 53.

SUMMARY

It is an objective of the present disclosure to provide an infrared transmissive product that restricts transmission of visible light rays more effectively than in a case in which fine pigment particles of which the particle sizes are uniform are evenly dispersed in a coating film layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an infrared transmissive product is provided that includes a body configured to cover a transmitting unit and a receiving unit for infrared rays in an infrared sensor. The body includes a base made of a transparent plastic having an infrared transmissivity, and a coating film layer that is formed on a rear surface of the base in a transmission direction of infrared rays from the transmitting unit and has an infrared transmissivity. The coating film layer includes dispersed aggregates of particles of a pigment.

In another general aspect, an infrared transmissive product is provided that includes a body configured to cover a transmitting unit and a receiving unit for infrared rays in an infrared sensor. The body includes a base made of a plastic having an infrared transmissivity, and a coating film layer that is formed on a front surface of the base in a transmission direction of infrared rays from the transmitting unit and has an infrared transmissivity. The coating film layer includes dispersed aggregates of particles of a pigment.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An infrared transmissive product for a vehicle 10 according to an embodiment will now be described with reference to FIGS. 1 and 2. In the embodiment, the infrared transmissive product is an infrared transmissive cover 30.

In the following description, the direction in which the vehicle 10 advances forward will be referred to as the front, and the reverse direction will be referred to as the rear. The vertical direction refers to the vertical direction of the vehicle 10, and the left-right direction refers to the vehicle width direction that matches with the left-right direction as viewed from a front-facing occupant. In FIG. 1, in order to make the size of each component of the infrared transmissive cover 30 recognizable, the scale of each component is altered as necessary. The same applies to FIGS. 4 and 5, which show modifications.

Figure 1:
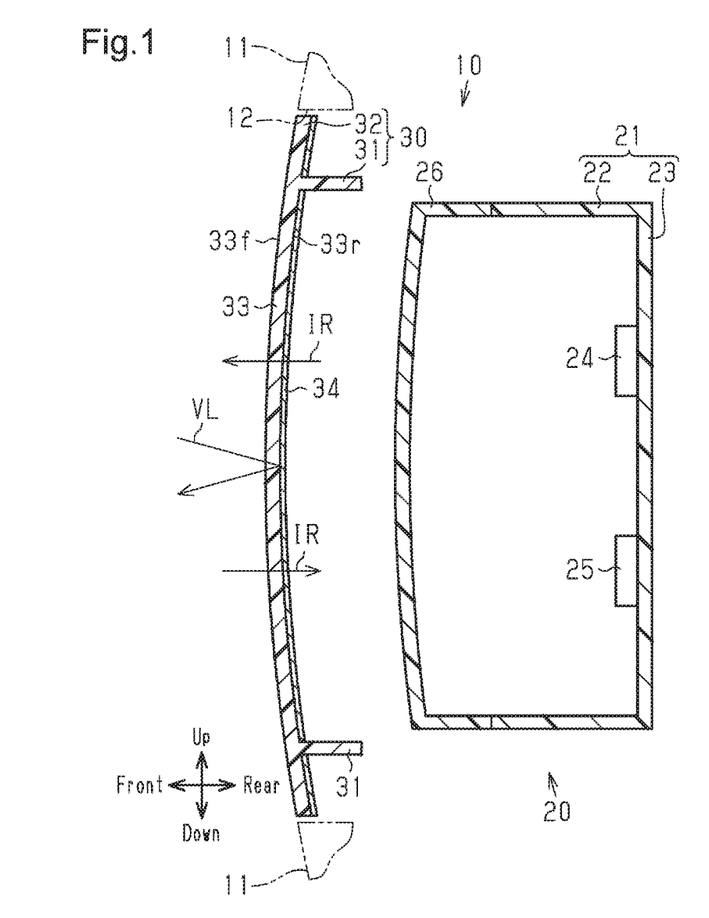
FIG. 1 is a cross-sectional side view of an infrared transmissive product according to an embodiment, illustrating an infrared sensor and an infrared transmissive cover, which is the infrared transmissive product.

As shown in FIG. 1, the vehicle 10 is equipped with a sensor that detects the surrounding environment. The sensor is an infrared sensor 20 that is arranged at the front part of the vehicle 10 and located at the center in the vehicle width direction. The infrared sensor 20 is arranged behind a front grille 11.

The infrared sensor 20 is configured to transmit infrared rays IR forward from the vehicle 10 and receive the infrared rays IR that have struck and been reflected by an object outside the vehicle 10, such as a leading vehicle or a pedestrian. The infrared rays IR are of a type of electromagnetic waves and have wavelengths that are longer than the wavelengths of visible light and shorter than the wavelengths of radio waves. Based on the transmitted infrared rays IR and the received infrared rays IR, the infrared sensor 20 recognizes the object outside the vehicle 10, and detects the distance between the vehicle 10 and the object and the relative velocity.

As described above, the infrared sensor 20 transmits the infrared rays IR forward from the vehicle 10. Thus, the transmission direction of the infrared rays IR from the infrared sensor 20 is the direction from the rear toward the front of the vehicle 10. The front in the transmission direction of the infrared rays IR substantially matches with the forward direction of the vehicle 10. The rear in the transmission direction also substantially matches with the rear of the vehicle 10. Accordingly, in the following description, the front in the transmission direction f the infrared rays IR will simply be referred to as "front" or "forward." The rear in the transmission direction will simply be referred to as "rear" or "rearward."

The rear half of the outer shell of the infrared sensor 20 is formed by a case 21. The front half of the outer shell of the infrared sensor 20 is formed by a cover 26. The infrared sensor 20 is fixed, for example, to a vehicle body.

The case 21 includes a tubular peripheral wall 22 and a bottom wall 23, which is provided at the rear end of the peripheral wall 22. The case 21 has the shape of a tube with an open front end and a closed end. The case 21 is entirely made of a plastic such as a polybutylene terephthalate plastic. A transmitting unit 24, which transmits infrared rays IR, and a receiving unit 25, which receives the infrared rays IR, are arranged on the front side of the bottom wall 23.

The cover 26 is made of a plastic that contains a visible light blocking pigment. Examples of such a plastic include, for example, polycarbonate, polymethacrylic acid methyl, cycloolefin polymer, and plastic glass. The cover 26 is arranged in front of the case 21 to cover the transmitting unit 24 and the receiving unit 25 from the front.

The front grille 11 has a window 12, which opens in front of the infrared sensor 20. The infrared transmissive cover 30 of the present embodiment is arranged in the window 12. The infrared transmissive cover 30 includes a plate-shaped cover body 32 and an attachment portion 31 protruding rearward from the cover body 32. The cover body 32 may also be referred to simply as the body. The cover body 32 is located in front of the cover 26 to indirectly cover the transmitting unit 24 and the receiving unit 25 from the front with the cover 26 in between. The infrared transmissive cover 30 is attached, for example, to the vehicle body at the attachment portion 31.

The infrared transmissive cover 30 is used as the cover for the infrared sensor 20 and also as a garnish for decorating the front part of the vehicle 10.

The cover body 32 includes a base 33 and a coating film layer 34. The base 33 is made of a transparent plastic having an infrared transmissivity, for example, the same plastic used for the cover 26.

The coating film layer 34 is formed by applying a paint containing a white pigment to a rear surface 33r of the base 33. The paint contains a transparent plastic and the pigment. The paint may contain a curing agent as necessary.

The transparent plastic as used herein contains at least one of the following as a main component: epoxy plastic, silicone plastic, urethane, urea-formaldehyde plastic, phenol plastic, polyethylene, polypropylene, polyethylene terephthalate, vinyl chloride, polystyrene, acrylonitrile-butadiene-styrene copolymer, acrylic plastic, polyamide, polyimide, polycarbonate, and melamine plastic. The "main component" refers to a component that affects the properties of the material, and the content of the "main component" is greater than or equal to 50% by mass.

A curing agent is used depending on the material of the transparent plastic. If the transparent plastic used herein contains epoxy plastic as the main component, an acid anhydride curing agent or a phenol curing agent may be used. If the transparent plastic used herein contains a material other than epoxy plastic as the main component, a curing agent may be omitted.

Depending on the purpose and the intended use, a curing agent other h acid anhydride curing agent or a phenol curing agent may be used. Examples of such curing agents include an amine-based curing agent, an agent obtained by partially esterificating an acid anhydride curing agent with alcohol, and a curing agent of carboxylic acid such as hexahydrophthalic acid, tetrahydrophthalic acid, and methyl-hexahydrophthalic acid. One of the listed curing agents may be used alone. Alternatively, two or more of the curing agents may be used in combination. Further, any of the curing agents may be used with an acid anhydride curing agent and a phenol curing agent.

The pigment used herein diffusely reflects light at the surfaces of the particles to produce a white color. Typical pigments include metal oxides such as titanium oxide and zinc oxide. Zinc oxide is also referred to as Chinese white (zinc white). Further, the pigment used herein may be zirconium oxide, silicon oxide, lithopone, or white lead. Lithopone is a white inorganic pigment obtained by mixing barium sulfate and zinc sulfide. White lead is a synonym for basic lead carbonate. One of the listed pigments may be used alone. Alternatively, two or more of the pigments may be mixed and used.

In a case in which a curing agent is used, a curing accelerator may be used together. In order to complement the property of reflecting visible light rays and allowing infrared rays to pass through, antioxidant, deterioration inhibitor, denaturant, coupling agent, antifoaming agent, leveling agent, or mold release agent may be used as necessary.

Figure 2:
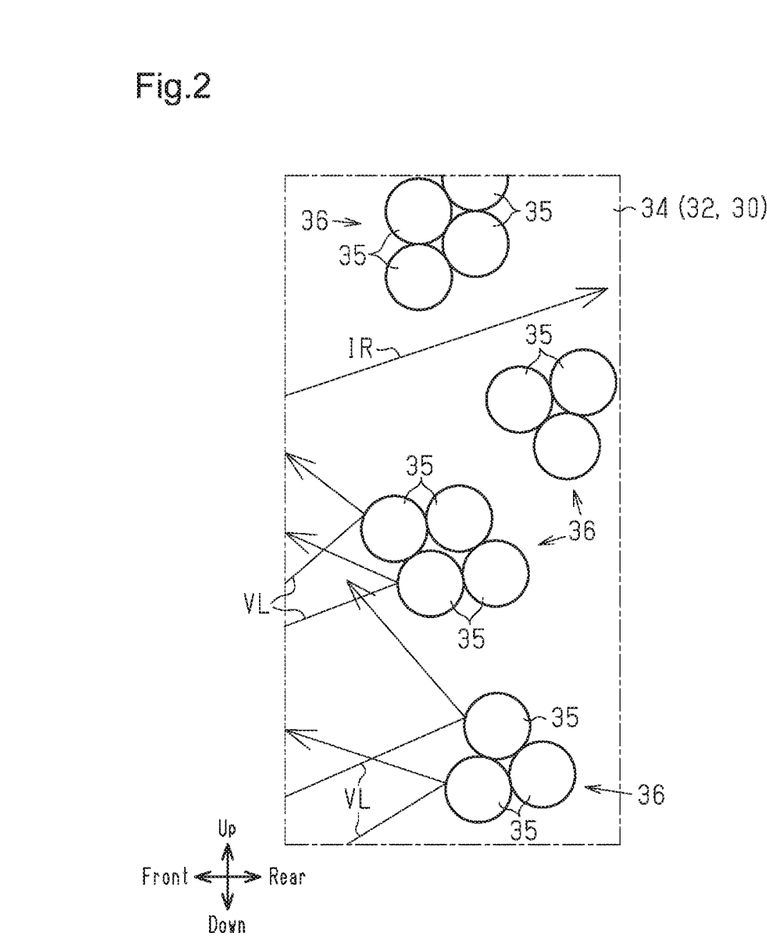
FIG. 2 is a diagram schematically showing a state in which aggregates of fine particles are dispersed in a coating film layer of the embodiment.

As shown in FIG. 2, the coating film layer 34 includes dispersed aggregates 36 of pigment particles.

The pigment used herein has nanosized particle sizes. To be distinguished from particles with typical particle sizes, the particles used herein are referred to as fine particles 35 in the present disclosure. The particle size of the fine particle 35 is referred to as a primary particle size, and the particle size of the aggregate 36 is referred to as a secondary particle size.

The relationship between the wavelength of scattering light and a particle size is generally expressed as the following Expression 1.

$$\alpha = \pi d / \lambda \quad \text{Expression 1}$$

In the Expression 1, $\alpha$ represents a scattering coefficient, which is determined by the material, d represents the particle size, and $\lambda$ is the wavelength of light. When the scattering coefficient $\alpha$ is less than 1, visible light scatters to produce a white color.

In the present embodiment, the pigment fine particles 35 are aggregated such that the secondary particle size of the aggregates 36 is in the range from 100 nm to 300 nm based on the Expression 1.

The infrared transmissive cover 30 is formed such that the light transmissivity when the wavelength is 900 nm is 30% or higher, and the L value in the Lab color system is 30 or greater. The Lab color system is one of the systems for expressing the color of an object using numeric values. The L value in the Lab color system represents brightness. The lower the L value, the lower the brightness is. The greater the L value, the higher the brightness is. The a value and the b value in the Lab color system represent chromaticity. The chromaticity numerically expresses a color using hue and chroma, without brightness. The a value represents the chromaticity in the range from green to red, while the b value represents the chromaticity in the range from blue to yellow.

An operation of the infrared transmissive cover 30 of the above-described embodiment will now be described. Advantages that accompany the operation will also be described.

When the infrared transmissive cover 30 is irradiated with visible light rays VL from the front as shown in FIGS. 1 and 2, the visible light rays VL pass through the base 33. Some of the visible light rays VL that have passed through the base 33 strike, and are reflected by, the aggregates 36, which are dispersed in the coating film layer 34. The pigment fine particles 35 of the aggregates 36 are aggregated such that the secondary particle size is in the range from 100 nm to 300 nm. Thus, as compared to gaps between evenly dispersed fine particles 53 shown in FIG. 7, the gaps between the aggregates 36 can be made small and uneven as shown in FIG. 2. Although the visible light rays VL pass through the gaps between the evenly dispersed fine particles 53 in FIG. 7, the same visible light rays VL are likely to strike, and be reflected by, the aggregates 36 in the case of FIG. 2. Therefore, the visible light rays VL of any wavelength are likely to be scattered. In the infrared transmissive cover 30 of the present embodiment, the L value in the Lab color system is 30 or greater when the wavelength is 900 nm. Thus, from the front, the infrared transmissive cover 30 appears in the color of the visible light rays VI, which have been reflected. In this case, the infrared transmissive cover 30 appears in a white color, which is a mixture of various colors.

Therefore, the coating film layer 34 prevents components located behind the infrared transmissive cover 30, particularly the transmitting unit 24 and the receiving unit 25 of the infrared sensor 20 from being visible through the infrared transmissive cover 30. In other words, the coating film layer 34 shields these components.

If the color of the infrared transmissive cover 30, which is attached to the vehicle 10, is significantly different from the color of the aesthetic components around the infrared transmissive cover 30, for example, the color of the front grille 11, consistency between the infrared transmissive cover 30 and the aesthetic components cannot be achieved, which degrades the aesthetic appeal. However, since the infrared transmissive cover 30 appears in a white color, the color can be easily matched with or made closer to the color of the aesthetic components as compared to a case in which the infrared transmissive cover 30 appears in a dark color such as a black color. This promotes the consistency with the aesthetic components, thereby improving the aesthetic appeal.

When the transmitting unit 24 of the infrared sensor 20 transmits infrared rays IR, the infrared rays IR pass through the coating film layer 34 and the base 33 in that order, as shown in FIG. 1. As described above, the pigment fine particles 35 of the aggregates 36 are aggregated such that the secondary particle size is in the range from 100 nm to 300 nm FIG. 2, the gaps between the aggregates 36 can be increased as compared to the gaps in a case in which pigment particles of unequal diameters are dispersed (refer to FIG. 6). In this case, the infrared rays IR easily pass through the gaps between the aggregates 36. After passing through the cover body 32, the infrared rays IR strike, and are reflected by, an object outside the vehicle 10, such as a leading vehicle or a pedestrian, and then pass through the base 33 and the coating film layer 34 in that order. At this time, in the coating film layer 34, the infrared rays IR easily pass through the gaps between the aggregates 36 as shown in FIG. 2 in the same manner as described above. After passing through the cover body 32, the infrared rays IR are received by the receiving unit 25. Based on the transmitted and received infrared rays IR, the infrared sensor 20 recognizes the object and detects the distance between the vehicle 10 and the object, and the relative velocity.

In the present embodiment, infrared rays IR having a wavelength of 900 nm are transmitted by the transmitting unit 24 and received by the receiving unit 25. At least 30% of the infrared rays IR pass through the infrared transmissive cover 30. This allows the infrared sensor 20 to properly recognize the object, and detect the distance between the vehicle 10 and the object, and the relative velocity.

Hereinafter, the above-described embodiment will be described more specifically with reference to Examples and Comparative Examples.

In the paint of Comparative Example 3, 20 parts by mass of the curing agent and 5 parts by mass of fine particles of titanium oxide in a dispersed state were combined with 100 parts by mass of the transparent plastic. The primary particle of the fine particles was 180 nm.

The paints of Examples 1, 2 and Comparative Examples 1 to 3 were applied to plates made of the same material as that of the base of the infrared transmissive cover 30 to prepare test pieces.

<Regarding Details and Results of Measurement>

The light transmissivities of the test pieces, which were prepared in the above-described manner, were measured at various wavelengths. Also, the L values in the Lab color system of the respective test pieces were measured. The measurement results of the light transmissivities are shown in the lower section of Table 1 and FIG. 3. The measurement results of the L values are shown in the lower section of Table 1.

TABLE 1

|  |  | Example 1 | Example 2 | Comparative Example 1 | Comparative Example 2 | Comparative Example 3 |
| --- | --- | --- | --- | --- | --- | --- |
| Transparent Plastic | Parts | 100 | 100 | 100 | 100 | 100 |
| Curing Agent | by | 20 | 20 | 20 | 20 | 20 |
| Pigment | Mass | 7 | 7 | 72 | 72 | 5 |
| Type of Pigment |  | Titanium Oxide | Zinc Oxide | Titanium Oxide | Titanium Oxide | Titanium Oxide |
| Pigment Primary Particle Size | nm | 35 | 35 | 30-50 | 80 | 180 |
| Pigment Secondary Particle Size |  | 140 | 170 | 198 | 200 | (235) |
| Light Transmissivity at Wavelength of 900 nm | % | 77.0 | 87.2 | 1.4 | 24.9 | 80.5 |
| Light Transmissivity at Wavelength of 550 nm |  | 22.7 | 69.6 | 0.5 | 0.5 | 34.6 |
| L Value in Lab Color System |  | 60.7 | 35.5 | 71.8 | 79.2 | 57.1 |

Examples 1, 2 and Comparative Examples 1 to 3

The components on Table 1 (shown below) were combined at ratios shown in Table 1 and mixed while being melted, thereby preparing paints of Examples 1, 2 and Comparative Examples 1 to 3. In the preparation, acrylic polyol was used as a transparent plastic, and hexamethylene diisocyanate was used as a curing agent.

In the paint of Example 1, 20 parts by mass of the curing agent 7 parts by mass of aggregates of titanium oxide were combined with 100 parts by mass of the transparent plastic. The primary particle size and the secondary particle size of the aggregates were 35 nm and 140 nm, respectively.

In the paint of Example 2, 20 parts by mass of the curing agent 7 parts by mass of aggregates of zinc oxide were combined with 100 parts by mass of the transparent plastic. The primary particle size and the secondary particle size of the aggregates were 35 nm and 170 nm, respectively.

In the paint of Comparative Example 1, 20 parts by mass of the curing agent and 72 parts by mass of aggregates of titanium oxide were combined with 100 parts by mass of the transparent plastic. The primary particle size of the aggregates was in the range from 30 nm to 50 nm, and the secondary particle size of the aggregates was 198 nm.

In the paint of Comparative Example 2, 20 parts by mass of the curing agent and 72 parts by mass of aggregates of titanium oxide were combined with 100 parts by mass of the transparent plastic. The primary particle size and the secondary particle size of the aggregates were 80 nm and 200 nm, respectively.

In Examples 1, 2 and Comparative Examples 1, 2, the secondary particle sizes of the pigments were in the range from 140 nm to 235 nm, which is within the above-described range from 100 nm to 300 nm.

Figure 3:
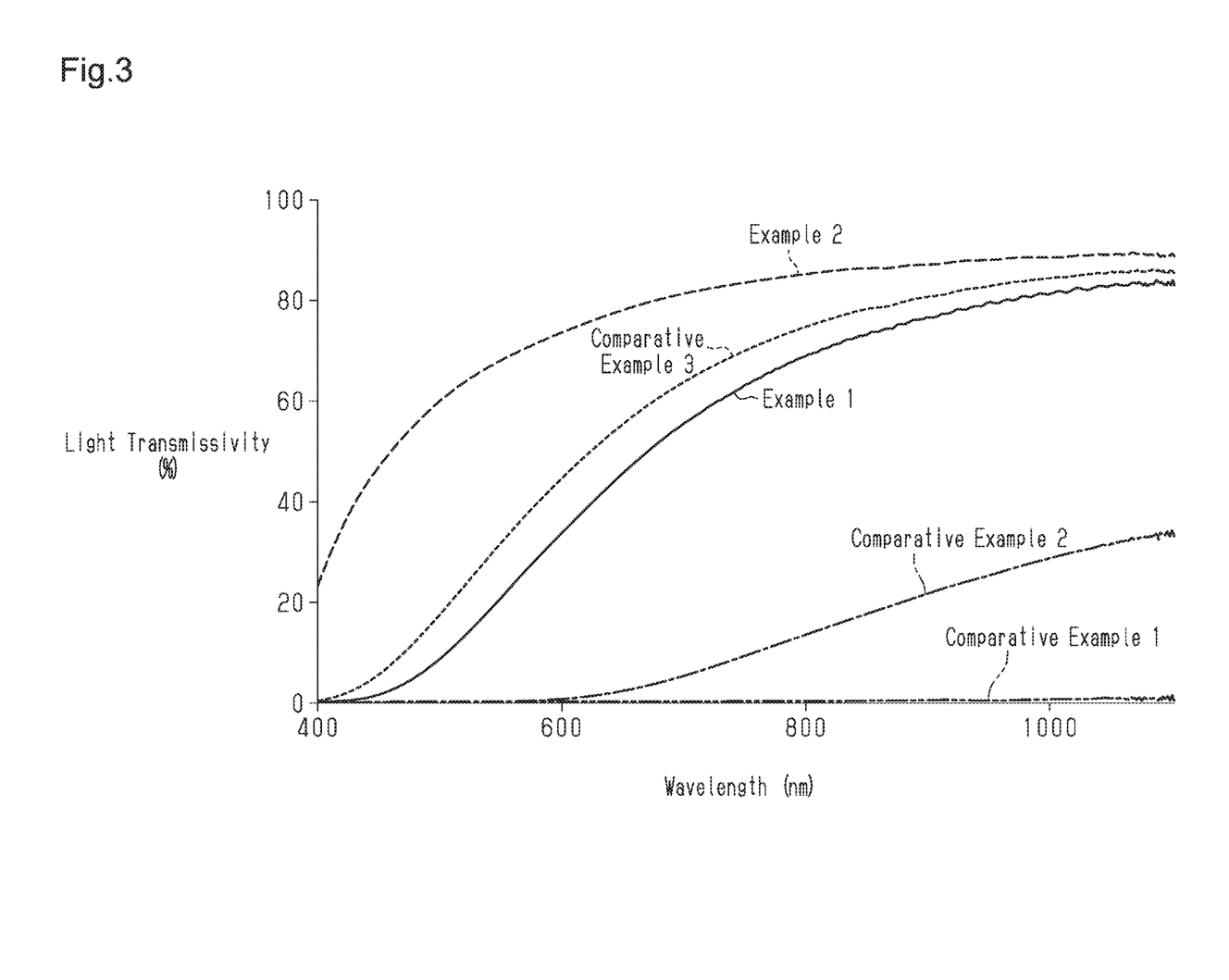
FIG. 3 is a graph showing measurement results of light transmissivities at respective wavelengths in Examples 1, 2 and Comparative Examples 1 to 3.

The light transmissivities of Comparative Examples 1, 2 were lower than those of Examples 1, 2 and Comparative Example 3 both in the wavelength region of the visible light rays VL and the wavelength region of the infrared rays IR. Also, Comparative Examples 1, 2 had comparatively large L values and thus produced a whiter color. It is thus presumed that the compounding ratios of the pigments of Comparative Examples 1, 2 were higher than a threshold acceptable value, and the gaps between the aggregates 36 were small. Accordingly, most of the visible light rays VL and the infrared rays IR are considered to have struck and been reflected by the aggregates 36. The light transmissivity of Comparative Example 1 was lower than that of Comparative Example 2 in the wavelength region of the infrared rays IR. The secondary particle sizes of the pigments in Comparative Example 1 and Comparative Example 2 were similar to each other, while the primary particle size of Comparative Example 1 is smaller than that of Comparative Example 2. It is thus presumed that, with the compounding ratio of the pigment being higher than the threshold acceptable value, the infrared rays IR were less likely to pass through Comparative Example 1, in which a pigment having a smaller primary particle size was aggregated, than through Comparative Example 2, in which a pigment having a larger primary particle size was aggregated.

Examples 1, 2 and Comparative Example 3 have a commonality in that the light transmissivity in the wavelength region of the infrared rays IR was higher than those of Comparative Examples 1, 2. It is thus presumed that the compounding ratios of the pigments of Examples 1, 2 and Comparative Example 3 were closer to the threshold acceptable value than those of Comparative Examples 1, 2. Accordingly, the gaps between the aggregates 36 are considered to have had sizes more appropriate for the infrared rays IR to pass through than in Comparative Examples 1, 2.

However, the light transmissivities of Examples 1, 2 and Comparative Example 3 in the wavelength region of the visible light rays VL were higher than those of Comparative Examples 1, 2. This is considered to be due to the fact that the visible light rays VL more easily passed through the gaps between the aggregates 36 in Examples 1, 2 and Comparative Example 3 than in Comparative Examples 1, 2.

The light transmissivity of the visible light rays VL of Example 2 is higher than that of Example 1. One of the reasons for this is considered to be the fact that the types of pigment were different, that the fact that titanium oxide was used in Example 1, while zinc oxide was used in Example 2. The L value of Example 2 was lower than those of Example 1 and Comparative Examples 1 to 3.

Example 1 and Comparative Example 3 had similar properties in the values of light transmissivity both in the wavelength region of the visible light rays VL and the wavelength region of the infrared rays IR. In either wavelength region, the light transmissivity of Example 1 is lower than that of Comparative Example 3. The difference between the light transmissivities was greater in the wavelength region of visible light rays than in the wavelength region of infrared rays. In Comparative Example 3, the primary particle size was large, and the pigment did not aggregate. In contrast, in Example 1, fine particles of pigment, of which the primary particle size was approximately one-fifth of that of Comparative Example 3, aggregated, and the secondary particle size was close to the primary particle size of Comparative Example 3. It thus can be said that aggregation of fine particles with a small primary particle size is more advantageous in reducing the light transmissivity of visible light rays VL than particles with a large primary particle size.

The above-described embodiment may be modified as follows. The above-described embodiment and the following modifications can be combined as long as the combined modifications remain technically consistent with each other.

In addition to the aggregates 36, fine particles 35 that are not aggregated may be dispersed in the coating film layer 34.

In the above-described embodiment, a layer having a different function may be provided behind the coating film layer 34.

Figure 4:
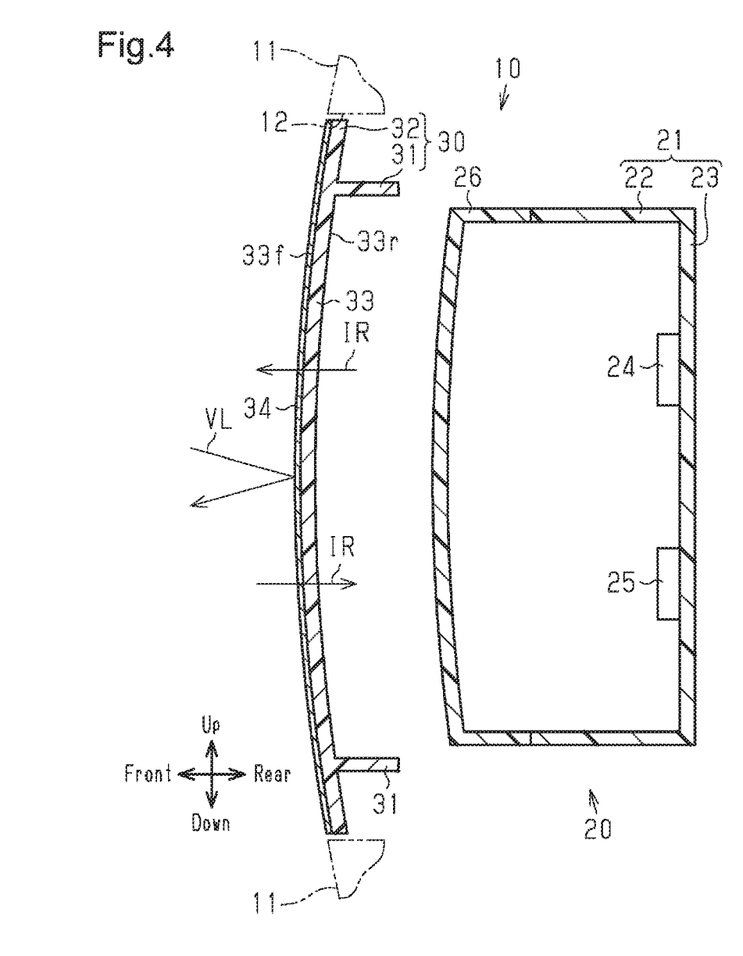
FIG. 4 is a cross-sectional side view corresponding to FIG. 1, showing a modification in which a coating film layer is formed on a front surface of a base.

As shown in FIG. 4, the coating film layer 34 may be formed on a front surface 33f of the base 33. In this case, the base 33 needs to be made of a plastic having an infrared transmissivity, but does not necessarily need to be transparent.

In the above-described embodiment, the visible light rays VL are applied to the coating film layer 34 after passing through the base 33. This modification is different from the above-described embodiment in that the visible light rays VL are directly applied to the coating film layer 34 without passing through the base 33. However, this modification is similar to the above-described embodiment in that visible light rays VL strike, and are reflected by, the aggregates 36 dispersed in the coating film layer 34.

In this modification, the infrared rays IR transmitted from the transmitting unit 24 pass through the base 33 and the coating film layer 34 in that order. Then after striking and being reflected by an object outside the vehicle, the infrared rays IR pass through the coating film layer 34 and the base 33 in that order before being received by the receiving unit 25. In this respect, this modification is different from the above-described embodiment, in which the transmitted infrared rays IR pass through the coating film layer 34 and the base 33 in that order, and the reflected infrared rays IR pass through the base 33 and the coating film layer 34 in that order. However, this modification is similar to the above-described embodiment in that the infrared rays IR pass through the gaps between the aggregates 36.

Therefore, this modification has the same advantages as the above-described embodiment.

In this modification, a layer having a different function may be provided in front of the coating film layer 34.

In the above-described embodiment, the infrared transmissive cover 30 is provided separately from the infrared sensor 20, However, an infrared transmissive cover may be a part of the infrared sensor 20.

Figure 5:
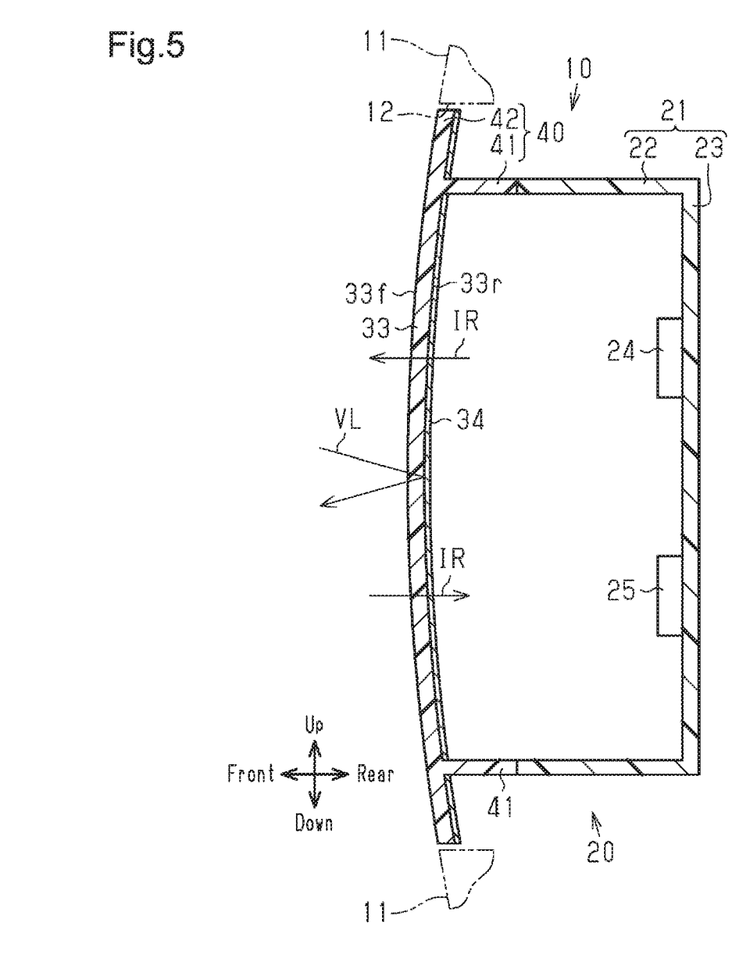
FIG. 5 is a cross-sectional side view showing a modification in which an infrared transmissive cover is also used as a cover.

More specifically, the cover 26, which is the front half of the outer shell of the infrared sensor 20 in FIG. 1, may be formed by the infrared transmissive cover 40 shown in FIG. 5. The infrared transmissive cover 40 includes a tubular peripheral wall 41 and a plate-shaped cover body 42 provided at the front end of the peripheral wall 41. The cover body 42 may be referred to simply as the body. The peripheral wall 41 is located in front of and adjacent to the peripheral wall 22 of the case 21 in the infrared sensor 20. The peripheral portion of the cover body 42, which extends further outward than the peripheral wall 41, does not necessarily need to extend further outward than the peripheral wall 41. Most of the cover body 42 is located in front of the bottom wall 23 of the infrared sensor 20 and covers the transmitting unit 24 and the receiving unit 25 from the front.

Even in this modification, the infrared transmissive cover 40 is used as the cover for the infrared sensor 20 and also as a garnish for decorating the front part of the vehicle 10.

The layer structure of the cover body 42 is the same as the layer structure of the cover body 32 in the above-described embodiment and FIG. 4. Therefore, this modification has the same operations and advantages as the above-described embodiment and the modification of FIG. 4.

The infrared transmissive covers 30, 40 can be used in a case in which the infrared sensor 20 is mounted in a section of the vehicle 10 different from the front part, for example, in the rear part. In this case, the infrared sensor 20 transmits infrared rays IR rearward from the vehicle 10. The infrared transmissive covers 30, 40 are arranged in front of the transmitting unit 24 in the transmission direction of the infrared rays IR, that is, behind the transmitting unit 24 in the vehicle 10.

The infrared transmissive covers 30, 40 can be used in a case in which the infrared sensor 20 is mounted in each of the side sections in the front part or the rear part of the vehicle 10, that is, the front corners or the rear corners.

The infrared transmissive product may be embodied as a product different from an infrared transmissive cover as long as the product covers the transmitting unit 24 and the receiving unit 25 of the infrared sensor 20 from the front in the transmission direction of the infrared rays IR.

The infrared transmissive product may be embodied as a product that covers a transmitting unit and a receiving unit of an infrared sensor used in a field different from the field of vehicles.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An infrared transmissive product, comprising:
 a body configured to cover a transmitting unit and a receiving unit for infrared rays in an infrared sensor, wherein
 the body includes
  a base made of a plastic having an infrared transmissivity, and
  a coating film layer that is formed on a front surface of the base in a transmission direction of infrared rays from the transmitting unit and has an infrared transmissivity,
 the coating film layer is made of a material including a transparent plastic,
 the coating film layer includes dispersed aggregates of particles of a pigment,
 a primary particle size that is a particle size of each of the particles is less than or equal to 50 nm,
 30 parts by mass or less of the aggregates is combined with 100 parts by mass of the transparent plastic, and
 the aggregates have a particle size in a range from 100 nm to 300 nm.

2. The infrared transmissive product according to claim 1, wherein a metal oxide is used as the pigment.

3. The infrared transmissive product according to claim 1, wherein
 a light transmissivity of the infrared transmissive product when a wavelength is 900 nm is 30% or higher, and
 an L value in a Lab color system of the infrared transmissive product is 30 or greater.

4. The infrared transmissive product according to claim 1, wherein the primary particle size of each of the particles further is about 35 nm.

5. The infrared transmissive product according to claim 1, further wherein about 7 parts by mass or more of the aggregates is combined with 100 parts by mass of the transparent plastic.

* * * * *